(12) United States Patent
Fisher et al.

(10) Patent No.: US 8,341,096 B2
(45) Date of Patent: Dec. 25, 2012

(54) SYSTEM, METHOD AND COMPUTER PROGRAM PRODUCT FOR INCREMENTAL LEARNING OF SYSTEM LOG FORMATS

(75) Inventors: Kathleen Fisher, Los Altos, CA (US);
David Walker, Princeton, NJ (US);
Kenny Zhu, Shanghai (CN)

(73) Assignee: AT&T Intellectual Property I, LP, Atlanta, GA (US)

( * ) Notice: Subject to any disclaimer, the term of this patent is extended or adjusted under 35 U.S.C. 154(b) by 519 days.

(21) Appl. No.: 12/626,761

(22) Filed: Nov. 27, 2009

(65) Prior Publication Data

US 2011/0131156 A1   Jun. 2, 2011

(51) Int. Cl.
*G06F 15/18* (2006.01)
*G06F 7/00* (2006.01)
*G06F 17/30* (2006.01)

(52) U.S. Cl. ......................................... 706/12; 707/708

(58) Field of Classification Search ........................ None
See application file for complete search history.

(56) References Cited

U.S. PATENT DOCUMENTS 6,473,896 B1 * 10/2002 Hicken et al. ................. 717/132
7,895,611 B2 * 2/2011 Grabarnik et al. ............ 719/328

OTHER PUBLICATIONS

K. Fisher, D. Walker, K. Zhu, and P. White. From dirt to shovels: Fully automatic tool generation from ad hoc data. In POPL, Jan. 2008.*
K. Fisher and R. Gruber. PADS: A domain specific language for processing ad hoc data. In PLDI, pp. 295-304, Jun. 2005.*
K. Fisher, D. Walker, K. Q. Zhu. LearnPADS: automatic tool generation from ad hoc data. In Proc ACM SIGMOD 2008: 1299-1302.*
Daly, Mark; Mandelbaum, Yitzhak; Walker, David; Fernandez, Mary; Fisher, Kathleen; Gruber, Robert; Zheng, Xuan. PADS: an end-to-end system for processing ad hoc data. SIGMOD '06 Proceedings of the 2006 ACM SIGMOD international conference on Management of data pp. 727-729 2006.*
Mandelbaum, Yitzhak. "The Theory and Practice of Data Description." 2006.*

(Continued)

*Primary Examiner* — Omar F Fernandez Rivas
*Assistant Examiner* — Daniel Pellett
(74) *Attorney, Agent, or Firm* — G. Michael Roebuck, P.C.; Bellaire Texas

(57) ABSTRACT

A computer program is disclosed including but not limited to instructions to input an initial description of a data format and a batch of data comprising data in a new data format not covered by the initial description, instructions to use the first description to parse the records in the data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and instructions to use a non-incremental format inference system such as LEARNPADS to infer descriptions for the aggregated portions of input data that did not parse using the first description D.

9 Claims, 10 Drawing Sheets

OTHER PUBLICATIONS

Mandelbaum, Yitzhak; Fisher, Kathleen; Walker, David; Fernandez, Mary; Gleyzer, Artem. "PADS/ML: a functional data description language." POPL '07 Proceedings of the 34th annual ACM SIGPLAN-SIGACT symposium on Principles of programming languages pp. 77-83 2007.*

Kathleen Fisher, Robert Gruber, PADS:a domain-specific language for processing ad hoc data, ACM Sigplan Notices, Jun. 2005, p. 295-304, vol. 40 Issue 6, ACM, New York, NY.

Qian Xi, Kathleen Fisher, David Walker, Kenny Zhu, Ad Hoc Data and the Token Ambiguity Problem, Lecture Notes in computer Science, 2009, pp. 91-106, vol. 5418, Springer-Variag, Berlin, Heidelberg.

Jay Earley, An efficient contest-free parsing algorithm, Feb. 1970, pp. 94-102, vol. 13, Issue 2, ACM, New York, NY.

Kathleen Fisher, David Walker, Kenny Zhu, Petter White, From dirt to shovels fully automatic tool generation from ad hoc data, POPL, Jan. 2008, pp. 421-434, Session 12, ACM, New York, NY.

Kathleen Fisher, David Walker, Kenny Zhu, Incremental Learning of System Log Formats, WASL, Oct. 2009, pp. 1-41, vol. 12, Issue 3, ACM, New York, NY.

* cited by examiner

*100*

207.136.97.49 - - [05/May/2009:16:37:20 –0400] "GET /README.txt HTTP/1.1" 404 216
ka38.kms.com – kim [10/May/2009:10:30:35 –0400] "GET /doc/prev.fig HTTP/1.1" 304 576

*200*

```
Punion client_t {
    Pip       ip;         // 207.136.97.49
};
Punion auth_id_t {
    Pchar unauthorized : unauthorized = = '_';
    Pstring (:' ':) id;
};
Pstruct request_t {
    "GET ";    Ppath       path;
    " HTTP/";  Pfloat      http_ver;
    "";
};
Precord Pstruct entry_t {
              client_t    client;
    ' ' ;     auth_id_t   remoteID;
    ' ' ;     auth_id_t   auth;
    " [";               Pdate    date;
    ' : ' ;             Ptime    time;
    " ] ";    request_trequest;
    ' ' ;               Pint                response;
    ' ' ;     Pint                length;
};
```

Descriptions:
Base : : = Pint    PstringME (re)
D : : =
  Base                  (Base token)
  Sync s             (Synchronizing token)
  Pair (D_1, D_2)     (Pair)
  Union (D_1, D_2)        (Union)
  Array (D, s, t)    (Array)
  Option D       (Option)

Data representation:
BaseR : : = Str s     Int i     Error
SyncR : : = Good     Fail     Recoverd s
R : : =
  BaseR
  SyncR
  PairR (R_1, R_2)
  Union1R R     Union2R R
  ArrayR (R list, SyncR list, SyncR)
  OptionR R

Aggregation structure:
A : : =
  BaseA Base
  SyncA s
  PairA (A_1, A_2)
  UnionA (A_1, A_r)
  ArrayA (A_elem, A_sep, A_term)
  OptionA A
  Opt A
  Learn [s]

```
incremental_step (d, xs) =
    as = [init_aggregate (d] ;
    foreach x in xs {
        rs = parse (d, x);
        foreach r in rs {
            foreach a in as {
                a' = aggregate (a, r);
                as' = a :: as'
            }
        }
        as = as'
    }
    best_a = select_best (as) ;
    d' = update_desc (d, best_a);
    return d'
```

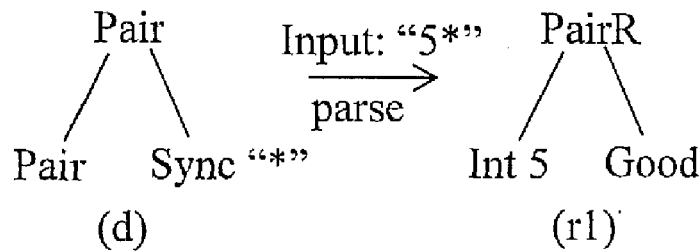
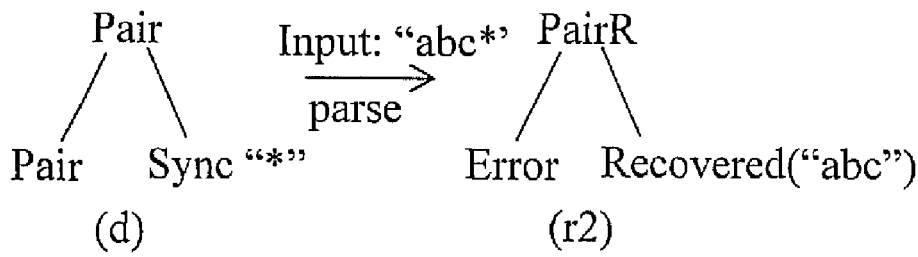
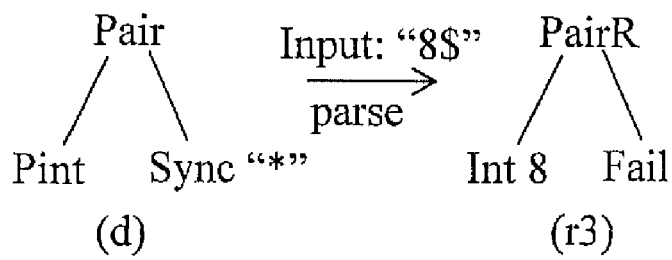
FIGURE 5

800

| Formats | K Lines KB | original | | incremental | |
|---|---|---|---|---|---|
| | | Time | TC | Time | TC |
| interface | 1.2/1285 | 48.5 | 0.7 | 2.9 | 1.1 |
| asl.log | 1.5/558 | 31.9 | 0.9 | 13.5 | 1.5 |
| error_log | 4.5/409 | 93.1 | 0.1 | 0.9 | 0.1 |
| access_log | 8.2/551 | 130.5 | 0.3 | 2.8 | 0.3 |
| coblitz | 9.4/2561 | - | - | 31.9 | 2.9 |
| pws | 17.4/3432 | - | - | 133 | 5.7 |
| ai.big | 57.4/5608 | - | - | 26.2 | 0.5 |
| exlog | 260.8/76720 | - | - | 610 | 3.0 |
| redirect | 302.6/102404 | - | - | 1852 | 17.1 |
| getbig | 550.4/92192 | - | - | 668 | 8.8 |

SYSTEM, METHOD AND COMPUTER PROGRAM PRODUCT FOR INCREMENTAL LEARNING OF SYSTEM LOG FORMATS

BACKGROUND

1. Field of the Disclosure

The present disclosure relates to the field of context free parsing.

2. Background of the Disclosure

System implementers and administrators manipulate a wide variety of system logs on a daily basis. Common tasks include data mining, querying, performing statistical analysis, detecting errors, and transforming the data to standard formats. Because many of these logs are in non-standard formats, there are often no ready-made tools to help process these logs. As a result, system engineers have to resort to writing one-off parsers, typically in Perl or Python, to ingest these data sources, a tedious, error-prone and costly process.

BRIEF DESCRIPTION OF THE FIGURES

FIG. 2 depicts a PAD/C description for the data in FIG. 1 in an illustrative embodiment;

FIG. 3 depicts a data structure used in incremental inference in an illustrative embodiment;

FIG. 5 depicts a result of parsing an input data line in an illustrative embodiment;

SUMMARY OF THE DISCLOSURE

Figure 1:
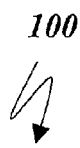
FIG. 1 depicts a fragment of a web server log in common log format in an illustrative embodiment.

A computer readable medium and system are disclosed for learning a data format, the system including but not limited to a processor in data communication with a computer readable medium; a computer program comprising instructions embedded in the computer readable medium, that when executed by a computer perform functions that are useful in learning the data format, the computer program further comprising instructions to input an initial description of a data format and a batch of data comprising data in a new data format not covered by the initial description, instructions to use the first description to parse the records in the data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and instructions to use a LEARNPADS system, or any system suitable to infer a description from raw data to infer descriptions for the aggregated portions of input data that did not parse using the first description D.

DETAILED DESCRIPTION OF AN ILLUSTRATIVE EMBODIMENT

System logs come in a large and evolving variety of formats, many of which are semi-structured and/or non-standard. As a consequence, off-the-shelf tools for processing such logs often do not exist, forcing analysts to develop their own tools, which is costly and time-consuming An illustrative embodiment of an incremental procedure is disclosed that automatically infers the format of system log files. From the resulting format descriptions, we can generate a suite of data processing tools automatically. The system can handle large-scale data sources whose formats evolve over time. Furthermore, it allows analysts to modify inferred descriptions as desired and incorporates those changes in future revisions.

In another particular illustrative embodiment, a system is disclosed for learning a data format, the system including but not limited to a processor in data communication with a computer readable medium; a computer program comprising instructions embedded in the computer readable medium, that when executed by a computer perform functions that are useful in learning the data format, the computer program further comprising instructions to input an initial description of a data format and a batch of data comprising data in a new data format not covered by the initial description, instructions to use the first description to parse the records in the data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and instructions to use a non-incremental format inference system such as LEARNPADS to infer descriptions for the aggregated portions of input data that did not parse using the first description D.

In another embodiment, a system is disclosed wherein a term with type R is a parse tree obtained from parsing the input data using a description D and wherein parsing an atomic data value (integer, string, date, time, etc) results in a value of the corresponding type (Int, String, Date, Time, etc), wherein a parse of a pair is a pair of representations, and a parse of a union is a parse selected from the group consisting of a parse of a first branch of the union or a parse of the second branch of the union. In another embodiment, a system is disclosed further including but not limited to an aggregate data structure embedded in the computer readable medium for containing data indicating an accumulation of parse trees and data that cannot be parsed using the first description, D and therefore must be re-learned. In another particular embodiment, a system is disclosed further including but not limited to a learn node data structure embedded in the computer readable medium containing data indicating an accumulation of the data that did not parse using the first description that needs to be learned.

In another embodiment, the computer program further includes but is not limited to instructions to finish parsing all the data, instructions to obtain a final list of aggregates and instructions to select the best aggregate according to at least one criterion, instruction to update the first description, D to produce the new description D' using the best aggregate and instructions to introduces Opt nodes above a BaseA or SyncA node whenever a corresponding Base or Sync token in the initial description D failed to parse. In another embodiment of the system, when faced with an entirely new form of data, the computer program further comprises instructions to introduce a LearnA node to accumulate the new data from multiple records to which the system will eventually apply a non-incremental learning algorithm to infer a description for the new data.

In another embodiment of the system, the computer program further includes but is not limited to instructions to rank the parses by a metric that measures their quality and return only the top quantity k of the parses. One possible metric comprises a triple: m=(e, s, c), where e is a quantity of errors, s is a quantity of characters skipped during Sync token recovery, and c is a quantity of characters correctly parsed. In another illustrative embodiment of the system, the computer program further comprising instructions to define a clean function that first partitions the triples into groups that share the substring of the input consumed by the parse, instructions to retain all perfect parses for each group and if none exist retain the best parse in the group and instructions to return all the perfect triples plus up to the top k non-perfect triples. In another illustrative embodiment, the computer program further comprising instructions to terminate a program further comprising instructions to maintain a global memo table data structure embedded in the computer readable medium, wherein the data structure stores data used by the processor and indexed by the pair of a description D and the beginning position for parsing D which stores the result for parsing D at the specific position and instructions to bound the total number of aggregates the produces by selecting the top quantity, k aggregates with the fewest number of Opt and Learn nodes.

In another embodiment of the system, the computer program further includes but is not limited to instructions to introduce a series of Opt nodes as each type in the original description D, fails in succession, instructions to collapses the series of Opt nodes if they are at least one of always present and always absent, and instructions to verify maintain a table that records the branching decisions when parsing each data line. This modification of replacing a collection of nested options with a top level option is only one example of a number of rewriting rules that are used in an illustrative embodiment to improve the inferred type. In an illustrative embodiment, the system and method applies a collection of rewriting rules that serve to improve the description by reducing a metric designed to measure description quality. A particular illustrative embodiment uses a minimum description length metric, described herein.

In another illustrative embodiment, a computer readable medium is disclosed containing a computer program comprising instructions that when executed by a computer perform functions that are useful in learning a data format, the computer program including but not limited to instructions to input an initial description of a data format and a batch of data comprising data in a new data format not covered by the initial description, instructions to use the first description to parse the records in the data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and instructions to use a non-incremental format inference system such as LEARN-PADS to infer descriptions for the aggregated portions of input data that did not parse using the first description D. In another illustrative embodiment of the medium, a term with type R is a parse tree obtained from parsing the input data using a description D and wherein parsing a base type results in a string, an integer or an error, wherein a parse of a pair is a pair of representations, and a parse of a union is a parse selected from the group consisting of a parse of a first branch of the union or a parse of the second branch of the union. In another illustrative embodiment of the medium, an aggregate data structure is disclosed embedded in the computer readable medium for containing data indicating an accumulation of parse trees and data that cannot be parsed using the first description, D and therefore must be re-learned. In another illustrative embodiment of the medium, the medium further includes but is not limited to a learn node data structure embedded in the computer readable medium containing data indicating an accumulation of the data that did not parse using the first description that needs to be learned. In another illustrative embodiment of the medium, the computer program further comprising instructions to finish parsing all the data, instructions to obtain a final list of aggregates and instructions to select the best aggregate according to at least one criterion, instructions to update the first description, D to produce the new description D' using the best aggregate and instructions to introduces Opt nodes above a BaseA or SyncA node whenever a corresponding Base or Sync token in the initial description D, failed to parse.

In another illustrative embodiment of the medium, when faced with an entirely new form of data, the computer program further comprises instructions to introduce a series of Opt nodes as each type in the original description D, fails in succession, instructions to collapses the series of Opt nodes if they are at least one always present and all always absent, and instructions to verify maintain a table that records the branching decisions when parsing each data line. In another illustrative embodiment of the medium, the computer program further comprising instructions to rank the parses by a metric that measures their quality and return only the top quantity k of the parses, wherein the metric comprises a triple: m=(e, s, c), where e is a quantity of errors, s is a quantity of characters skipped during Sync token recovery, and c is a quantity of characters correctly parsed. In another illustrative embodiment of the medium, the computer program further comprising instructions to define a clean function that first partitions the triples into groups that share the substring of the input consumed by the parse, instructions to retain all perfect parses for each group and If none exist retain the best parse in the group and instructions to return all the perfect triples plus up to the top k non-perfect triples. In another illustrative embodiment of the medium, the computer program further comprising instructions to terminate a candidate parse when parsing a struct with multiple fields if a threshold quantity, T of errors in succession are encountered. In another illustrative embodiment of the medium, the computer program further comprising instructions to maintain a global memo table data structure embedded in the computer readable medium, wherein the data structure stores data used by the processor and indexed by the pair of a description D and the beginning position for parsing D which stores the result for parsing D at the specific position and instructions to bound the total number of aggregates the produces by selecting the top quantity, k aggregates with the fewest number of Opt and Learn nodes.

To facilitate working with such log files, the inventors have developed PADS (see, K. Fisher and R. Gruber. *PADS: A domain specific language for processing ad hoc data*, PLDI, pages 295-304, June 2005 (which is hereby incorporated by reference herein in its entirety)); J. Earley, *An efficient context-free parsing procedure*, Communications of the ACM, 13(2): 94-102, 1970 (which is hereby incorporated by reference herein in its entirety), a high-level declarative specification language for describing the physical formats of ad hoc data. A PADS description for a data source precisely documents the format of the data, and the PADS system compiles such descriptions into a suite of useful processing tools including an XML-translator, a query engine, a statistical analyzer, and programmatic libraries and interfaces. Analysts can then either use these generated tools to manage the logs or write custom tools using the generated libraries.

A significant impediment to using PADS is the time and expertise required to write a PADS description for a new data source. If such a source is well-documented, writing a PADS description is straightforward and requires time proportional to the existing documentation. If the new data source is not well documented, this process is time-consuming, often requiring days for complex formats. The inventors developed the LEARNPADS system (see, K. Fisher, D. Walker, K. Zhu, and P. White, *From dirt to shovels: Fully automatic tool generation from ad hoc data*, POPL, January 2008 (which is hereby incorporated by reference herein in its entirety); Q. Xi, K. Fisher, D. Walker, and K. Q. Zhu. *Ad hoc data and the token ambiguity problem*, PADL' September 2009 (which is hereby incorporated by reference herein in its entirety)) which automatically infers a PADS description from sample data, and thus eliminates the need for hand-written descriptions. The LEARNPADS system successfully produces correct descriptions for a range of small data sources, but it cannot handle larger ones because the system includes a memory-intensive procedure designed to process the entire data source at once. An illustrative embodiment automatically infers descriptions of system log files by adapting LEARNPADS to work incrementally. With this modification, the system takes as input an initial description and a new batch of data. It returns a modified description that extends the initial description and covers the new data as well. The initial description can be supplied by the user or the system can use the original LEARNPADS system to infer it. This iterative architecture also allows the user to take the output of the system, make revisions such as replacing generated field names like IP_1 with more meaningful names like src, and then use the refined description as the basis for the next round of automatic revision.

PADS provides a declarative data description language that allows data analysts to describe both the physical layout of ad hoc data sources and semantic properties of that data. From such descriptions, the PADS compiler generates libraries and tools for manipulating the data, including parsing routines, statistical profiling tools, translation programs to produce well-behaved formats such as XML or those required for loading relational databases, and tools for miming XQueries over raw PADS data sources. The descriptions are concise enough to serve as "living" documentation while flexible enough to describe most of the ASCII, binary, and Cobol formats seen in practice. The generated parsing library provides for robust, application-specific error handling. PADS is suitable for describing ad hoc data formats in binary, ASCII, and EBCDIC encodings. From a PADS description, the PADS compiler generates a library for manipulating the associated data source. The PADS/ML compiler generates an ML library while PADS/C generates a C library. Data analysts can use the generated library directly, or they can use a suite of auxiliary tools to summarize the data, validate it, translate it into XML, or reformat it into a form suitable for loading into relational databases.

The disclosure then describes an illustrative embodiment of an incremental inference system, method and computer program product and discusses their implementation, and gives some experimental results. An illustrative embodiment uses a simple web server log format, which is referred to herein as w1, to illustrate the principal features of the PADS data description language.

Turning now to FIG. 1, FIG. 1 shows a fragment of such data 100, which is comprised of a sequence of records, separated by new lines. Each record contains a number of fields delimited by white space. For example, the first record starts with an IP address, then has two dashes, a time stamp enclosed in square brackets, a quoted HTTP message, and finally two integers. The second record shows some variation: the IP address becomes a hostname and the second dash becomes an identifier. PADS uses a type-based metaphor to describe ad hoc data. Each PADS type plays a dual role: it specifies a grammar by which to parse the data and a data-specific data structure in which to store the results of the parse. PADS/C is the variant of PADS that uses C as its host language. Hence, PADS/C types are drawn by analogy from C, and the generated data structures and parsing code are in C.

Turning now to FIG. 2, FIG. 2 shows a PADS/C specification 200 that describes each of the records depicted in FIG. 1. The specification consists of a series of declarations. Types are declared before they are used, so the last declaration entry_t describes the entirety of a record, while the earlier declarations describe data fragments. Type entry_t is a Precord, meaning it comprises a full line in the input, and is a Pstruct, meaning it consists of a sequence of named fields, each with its own type. For convenience, Pstructs can also contain anonymous literal fields, such as "[", which denote constants in the input source. The generated representation for entry_t will be a C struct with one field for each of the named fields in the declaration. The type client_t is a Punion, meaning the described data matches one of its branches, by analogy with C unions. In particular, a client_t is either an IP address (Pip) or a host name (Phostname), where Pip and Phostname are PADS/C base types describing IP addresses and hostnames, respectively.

In general, base types describe atomic pieces of data such as integers (Pint) and floats (Pfloat), characters (Pchar) and strings (Pstring(:' ':)), dates (Pdate) and times (Ptime), paths (Ppath), etc. Strings represent an interesting case because in theory they could go on forever, so Pstring takes a parameter which specifies when the string stops: in this case, when it reaches a space. To account for more general stopping conditions, the base type Pstring_ME takes as a parameter a regular expression. With this type, the corresponding string is the longest that matches the regular expression. The first branch of the Punion auth_id_t illustrates the use of a constraint. It specifies that the unauthorized character must be equal to '-'. If the constraint fails to hold, the next branch of the union will be considered.

In addition to the features illustrated in FIG. 2, PADS provides arrays, which describe sequences of data all of the same type; options, which describe data that may be present; and switched unions, which describe unions where a value earlier in the data determines which branch to take. Such unions illustrate that PADS supports dependencies: earlier portions of the data can determine how to parse later portions.

The goal of the LEARNPADS format inference engine is to infer a PADS description like the one in FIG. 2 from raw data. From such a description, the PADS compiler can produce end-to-end processing tools fully automatically. A full description of the LEARNPADS procedure appears in an earlier paper, (see, K. Fisher, D. Walker, K. Zhu, and P. White, *From dirt to shovels: Fully automatic tool generation from ad hoc data*, POPL, January 2008) (which is hereby incorporated by reference herein in its entirety). LEARNPADS assumes that the input data is a sequence of new line-terminated records and that each record is an instance of the desired description. From such an input, it uses a three-phase procedure to produce a description. In the tokenization phase, LEARNPADS converts each input line into a sequence of tokens, where each token type is defined by a regular expression. These tokens correspond to PADS base types. In the structure discovery phase, LEARNPADS computes a frequency distribution for each token type and then uses that information to determine if the top-level structure of the data source is a base type, Pstruct, Parray, or Punion. Based on that determination, the procedure partitions the data into new contexts and recursively analyzes each of those contexts, constructing the corresponding description as it recurses. This phase terminates with a candidate description. In the format refinement phase, the procedure uses an information-theoretic scoring function to guide the application of rewriting rules. These rules seek to minimize the size of the description while improving its precision by performing structural transformations (such as merging adjacent Pstructs), adding data dependencies, and constraining the range of various base types, e.g., converting a general integer to a 32-bit integer.

The scoring function, which is based on the minimum description length principle (see, P. D. Grunwald, *The Minimum Description Length Principle*, MIT Press, May 2007 (which is hereby incorporated by reference herein in its entirety)) measures how well a description describes data by calculating the number of bits necessary to transmit both the description and the data given the description. We use the terms type and data complexity to refer to the number of bits necessary to encode the description and to encode the data given the description, respectively. This function penalizes overly general descriptions, such as Pstring, which have an extremely low type complexity but a very high data complexity. It also penalizes overly specific descriptions that painstakingly describe each character in the data. Such descriptions have a low data complexity, but a high type complexity. This procedure produces good results for the small log files that we have experimented with, but it has two limitations: performance and adaptability. In terms of performance, the procedure requires space quadratic in the input file size to perform the data dependency analysis, so it cannot be used on log files larger than the square of the size of usable memory. In terms of adaptability, the procedure only considers its input data in constructing a description. Hence if tomorrow's log file has a new kind of record, the procedure cannot modify the existing description; it must start from scratch.

An illustrative embodiment provides an incremental system and method that extends LEARNPADS to work incrementally. Given a candidate description D, the incremental system and method use D to parse the records in the data source. The incremental system and method discards records that parse successfully, since these records are already covered by D, but it collects records that fail to parse. When the system and method accumulate M such records, where M is a parameter of the procedure, it invokes the incremental learning step, described below, to produce a refined description D'. This refined description subsumes D and describes the M new records. In addition, the incremental attempts to preserve as much of the structure of D as possible, so users supplying initial descriptions can recognize the resulting descriptions.

The procedure then takes D' to be the new candidate description and repeats the process until it has consumed all the input data. The initial description D can either be supplied by a user or it can be inferred automatically by applying the original procedure to N records selected from the data source, where N is another parameter. The incremental learning step works by attempting to parse each of the M records according to the current description D. It discards the portions of each record that parse correctly. If a portion fails to parse, that failure will be detected at a particular node in the description D. It collects these failed portions in an aggregation data structure A that minors the structure of D. After thus aggregating all the failures in the M records, the procedure transforms D to accommodate the places where differences were found (i.e., by introducing options where a piece of data was missing or unions where a new type of data was discovered). It then uses the original LEARNPADS procedure to infer descriptions for the aggregated portions of bad data.

FIG. 3 depicts illustrative data structures 300 for descriptions D, data representations R, and aggregate structures A. In these illustrative data structures, variable re arranges over regular expressions, s and t over strings, and i over integers. A value with type D is the abstract syntax tree of PADS description: it is what we want to learn. For simplicity of presentation, we assume just two base types: integers and strings that match a regular expression. Synchronizing tokens, or sync tokens for short, correspond to string literals in PADS descriptions. Such tokens, which are often white space or punctuation, serve as delimiters in the data and are useful for detecting errors. We use binary pairs and unions to account for the Pstructs and Punions in PADS/C descriptions. An array has an element type described by D, a separator string s that appears between array elements, and a terminator string t. Option D indicates D is optional.

A term with type R is a parse tree obtained from parsing data using a description D. Parsing a base type can result in a string, an integer or an error. Parsing a sync token Sync s can give three different results: Good, meaning the parser found sat the beginning of the input; Fail, meaning s is not a substring of the current input; or Recovered s', meaning s is not found at the beginning of the input, but can be recovered after "skipping" string s'. The parse of a pair is a pair of representations, and the parse of a union is either the parse of the first branch or the parse of the second branch. The parse of an array includes a list of parses for the element type, a list of parses for the separator and a parse for the terminator which appears at the end of the array.

An aggregate structure is the accumulation of parse trees; it collects the data that cannot be parsed and therefore must be re-learned. The aggregation structure minors the structure of the description D with two additional nodes: an Opt node, and a Learn node. An invariant is that an Opt node always wraps a BaseA or a SyncA node, where it indicates that the underlying base or sync token is missing in some of the parses being aggregated, and therefore that the wrapped token should be made optional. The Learn node accumulates the bad portions of the data that need to be learned. The newly learned sub-descriptions will be spliced into the original description to get the new description.

Figure 4:
FIG. 4 depicts pseudo-code for an incremental learning step in an illustrative embodiment.

FIG. 4 depicts pseudo-code 400 for the incremental learning step. The init_aggregate function initializes an empty aggregate according to description d. Then for each data record x, an illustrative embodiment uses the parse function to produce a list rs of possible parses. An illustrative embodiment then calls the aggregate function to merge each parse r in the current list of parses with each aggregate a in the current list of aggregates. An illustrative embodiment uses '::' to denote consing an element onto the front of a list. When an illustrative embodiment finishes parsing all the data lines and obtain a final list of aggregates as, an illustrative embodiment selects the best aggregate according to some criterion, and finally update the previous description d to produce the new description d' using substantially the best aggregate.

Figure 6:
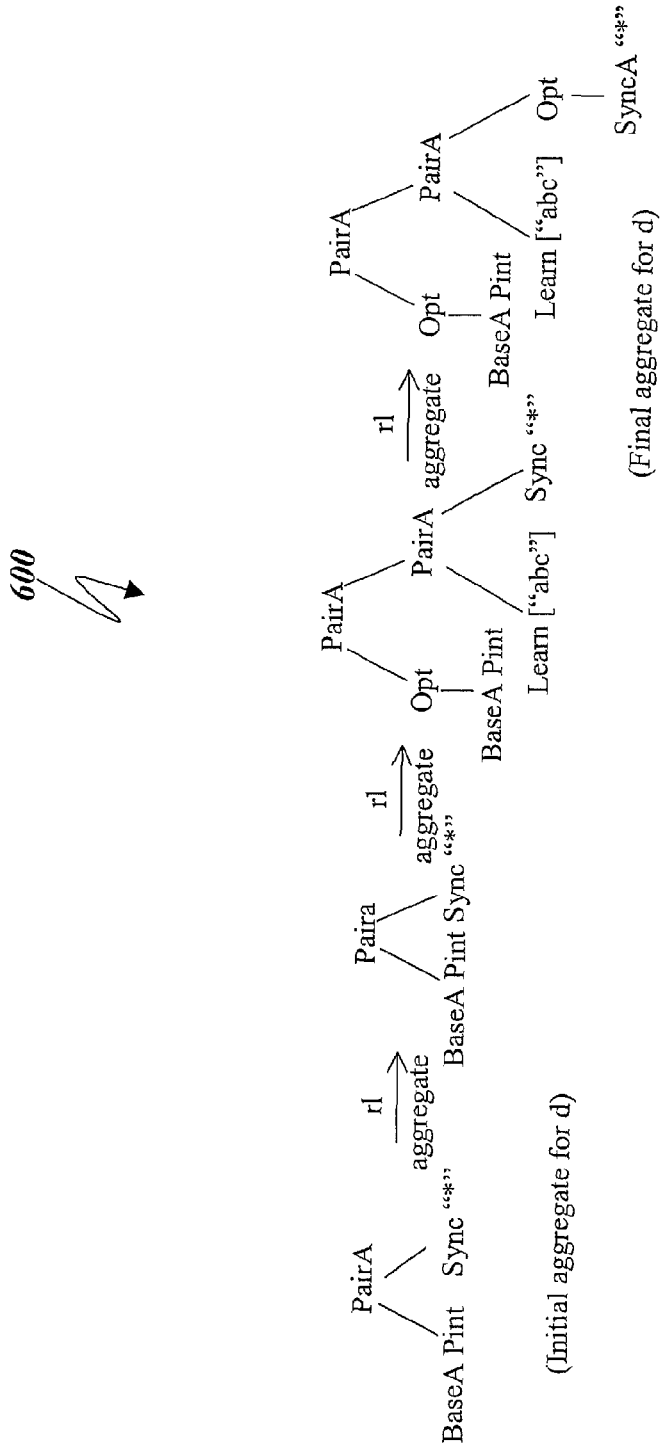
FIG. 6 depicts an aggregation of parse trees in an illustrative embodiment.

To illustrate the parsing and aggregation phases of the procedure, a simple example follows. Suppose a description d, is comprised of a pair of an integer and a sync token "*", and an illustrative embodiment is given the following three lines of new input: 5*, abc*, 8$. FIG. 5 shows the three data representations 500, that result from parsing the lines, which are referred to herein as r1, r2 and r3, respectively. Notice the first line parsed without errors, the second line contains an error for Pintand some unparsable data "abc", and the third contains a Failnode because the sync token * was missing. FIG. 6 shows the aggregation of r1 to r3 600 starting from an empty aggregate. In general, Error and Fail nodes in the data representation trigger the creation of Opt nodes in the aggregate, while unparsable data is collected in Learnnodes.

The illustrative embodiment presented so far is idealized and unoptimized. In this section, the present disclosure discusses refinements that improve the quality of the inferred descriptions and/or improve performance of an illustrative embodiment. So far, parsing a Sync token yields one of three results: Good, Fail or Recovered. In the actual implementation, a Sync token can be not only a constant string, but also a constant integer, an integer range or a combination thereof. Consider parsing the token Sync (Str "GET") when the current input starts with "POST." The parse_base function indicates the result should be Fail. In reality, the input "POST" is in the same family as "GET," i.e., a word, and it may very well be that this Sync token should have been an enumeration of words rather than a single word. To handle such cases, we created a fourth type of parse node, Partial, to indicate that the input belongs to the same family as the expected token but does not match exactly, i.e., it is partially correct. During aggregation, partial nodes cause the description to be specialized to include the additional values. In the above example, the aggregate function will change the description to Sync (Enum [Word "GET", Word "POST"]). Such partial nodes reduce the number of parsing errors and produce more compact and meaningful descriptions.

Figure 7:
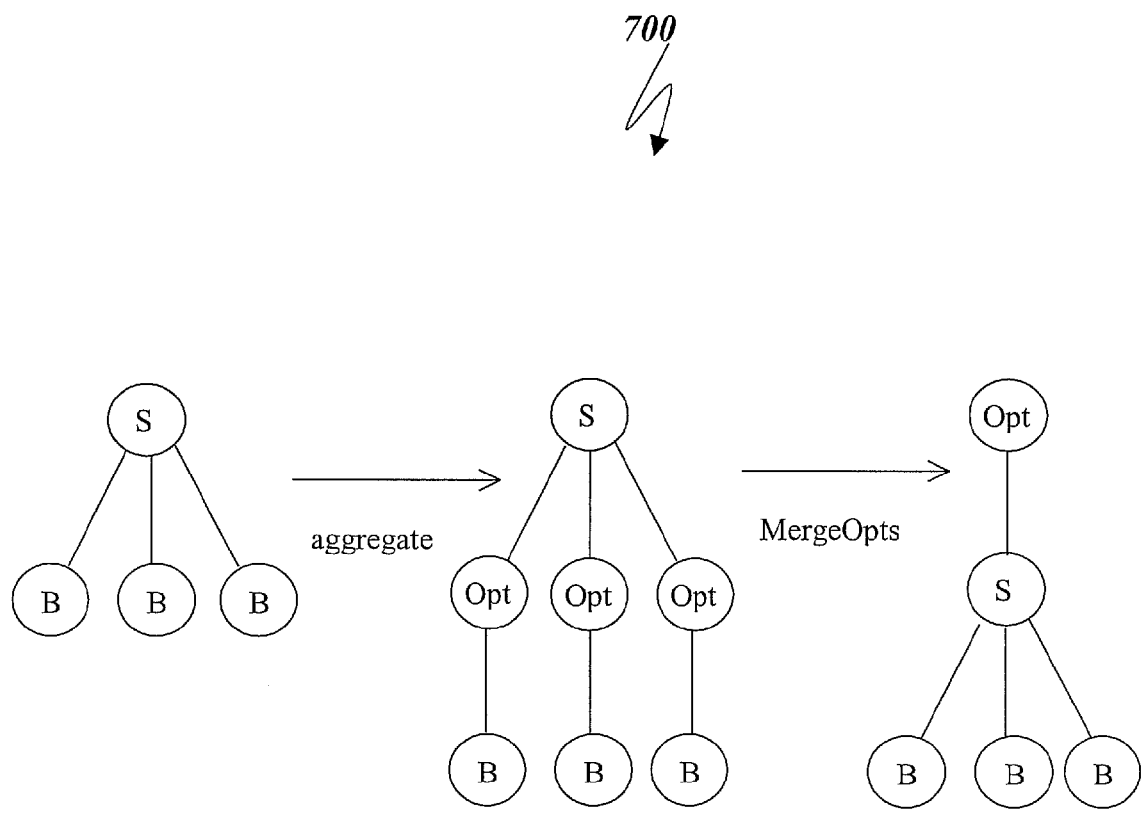
FIG. 7 depicts a MergeOpts rewriting rule in an illustrative embodiment.

When the incremental learning procedure produces a refined description from an aggregate, the procedure applies rewriting rules to the new description to improve its quality and readability. We introduce a new data dependent rule called MergeOpts to optimize a type pattern that occurs frequently during incremental learning. Recall that the aggregate function introduces Opt nodes above a BaseA or SyncA node whenever the corresponding Base or Sync token in the description failed to parse. When faced with an entirely new form of data, the procedure is likely to introduce a series of Opt nodes as each type in the original description fails in succession. The MergeOpts rule collapses these consecutive Opt nodes if they are correlated, i.e., either they are all always present or all always absent. To verify this correlation, the procedure maintains a table that records the branching decisions when parsing each data line. It uses this table to determine whether to merge adjacent Optnodes during rewriting. FIG. 7 illustrates the effect of this rule. In the FIG., S denotes a strict and B a base token. The pseudo-code in FIG. 4 suggests the number of aggregates is of the order O(mn), where m is the maximum number of parses for a line of input and n is the number of lines B to aggregate. Clearly, this pseudo code will not scale unless m and n are bounded. Several optimization have been implemented to limit the number of parses and aggregates. First, an illustrative embodiment does not return all possible parses when parsing a description component D. Instead, we rank the parses by a metric that measures their quality and return only the top k. The metric is a triple: $m=(e, s, c)$, where e is the number of errors, s is the number of characters skipped during Sync token recovery, and c is the number of characters correctly parsed. The metric is considered perfect if $e=0$. Metric m1 is better than m2 if m1 is perfect and m2 is not, or if $(c1/(s1+c1))>(c2/s2+c2))$. In practice, parse returns a list of parse triples (r, m, j), where r is the data representation of the parse, m is the metric associated with r, and j is the position in the input after the parse. We define a clean function that first partitions the triples into groups that share the same span, i.e., the substring of the input consumed by the parse. For each group, clean retains all perfect parses. If none exists, it retains the best parse in the group. We justify discarding the other triples because given a description d and a fixed span, we always prefer the parse with the best metric. Finally clean returns all the perfect triples plus up to the top k non-perfect triples. The clean function reduces the number of bad parses to a constant k while guaranteeing that if there is a perfect parse, it will be returned.

Figure 8:
FIG. 8 depicts execution times and type complexities in an illustrative embodiment.

A second optimization, which we call parse cut-off, terminates a candidate parse when parsing a struct with multiple fields f1, f2, fn if the incremental system and method encounter a threshold number of errors in succession. This technique may result in no possible parses for the top-level description. In this case, we restart the process with the parse cut-off optimization turned off. A third optimization is memorization. The program keeps a global memo table indexed by the pair of a description D and the beginning position for parsing D which stores the result for parsing D at the specific position. Finally, an illustrative embodiment bounds the total number of aggregates the procedure can produce by selecting the top k aggregates with the fewest number of Opt and Learn nodes. To evaluate the incremental procedure, it was run along with the original LEARNPADS system on 10 different kinds of system logs of various sizes. The experiments were conducted on a Power-Book G4 with a 1.67 GHz PowerPC CPU and 2 GB memory running Mac OS X 10.4. FIG. 8 summarizes the results. The second column lists the number of lines and the size of each log. The time columns give the total running time in seconds, and the TC columns give the type complexity of the final description. In general, a lower type complexity means a more compact description. For all benchmarks, the initial learn size N is 500 lines and the incremental learn size M is 100 lines. A "-" indicates the original system failed to produce a description within thirty minutes. FIG. 8 shows the incremental procedure learns descriptions 800 that are slightly less compact than the original but in a much shorter time.

Figure 9:
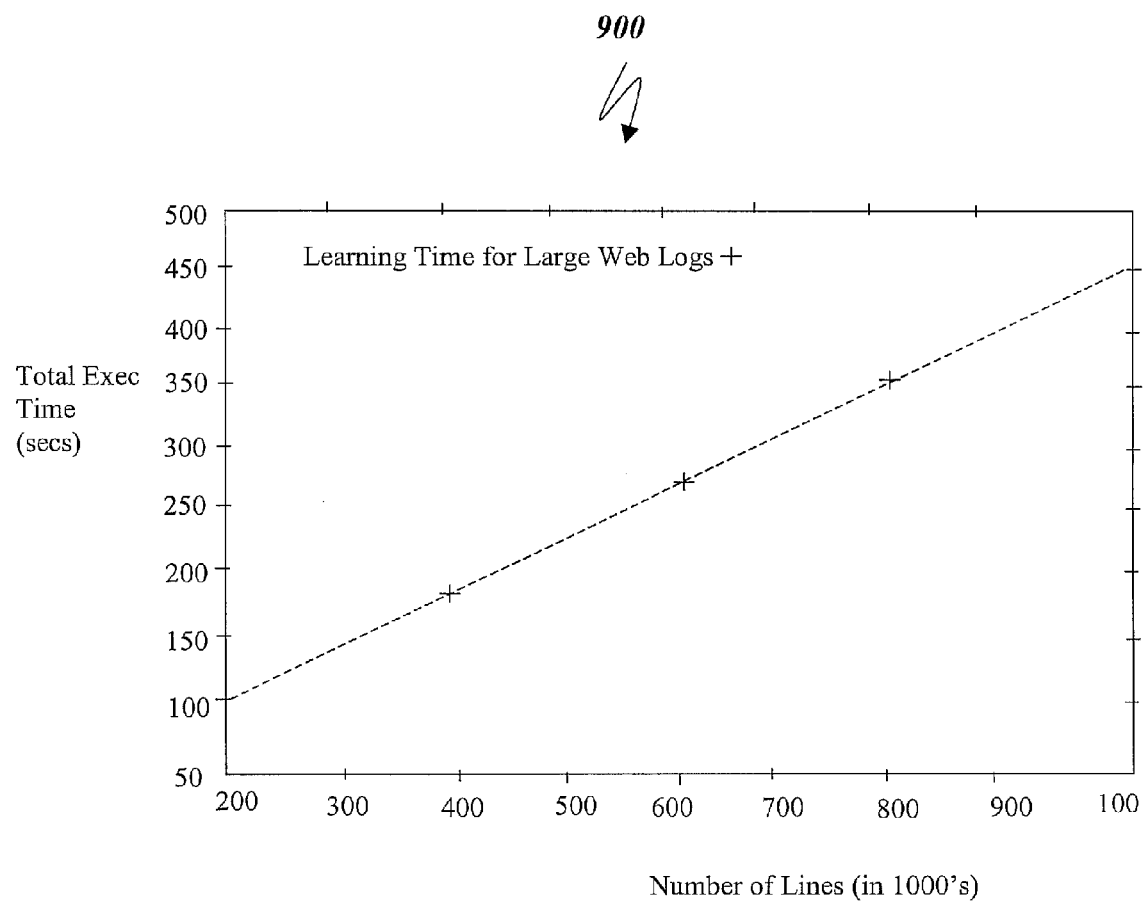
FIG. 9 depicts scaling of an incremental system performance in an illustrative embodiment.

To measure the correctness of the inferred descriptions, we generated parsers from each description and used them to parse the data. All formats parsed with zero errors except for the pws format, a form of Apache server log, which contains a number of errors. These errors arise because PADS uses greedy matching to parse unions. The second experiment measures the execution time of learning descriptions for a series of web server logs ranging in size from 200 k to one million lines. This data private so that the experiments were run on an internal server which runs GNU/Linux and has a 1.60 GHz Intel Xeon CPU with 8 GB of memory. FIG. 9 suggests the incremental procedure scales linearly with the number of lines. In particular, the procedure learns a description for a million-line web log in under 10 minutes. The inferred description yields a parser that correctly parses all lines in the log.

The inventors have presented an incremental system and method for inferring system log formats. The inventors experimentally verified that this procedure can produce quality descriptions within minutes when run on files with hundreds of thousands of lines. Our experience suggests that the quality of the final description is very sensitive to the quality of the initial description.

Figure 10:
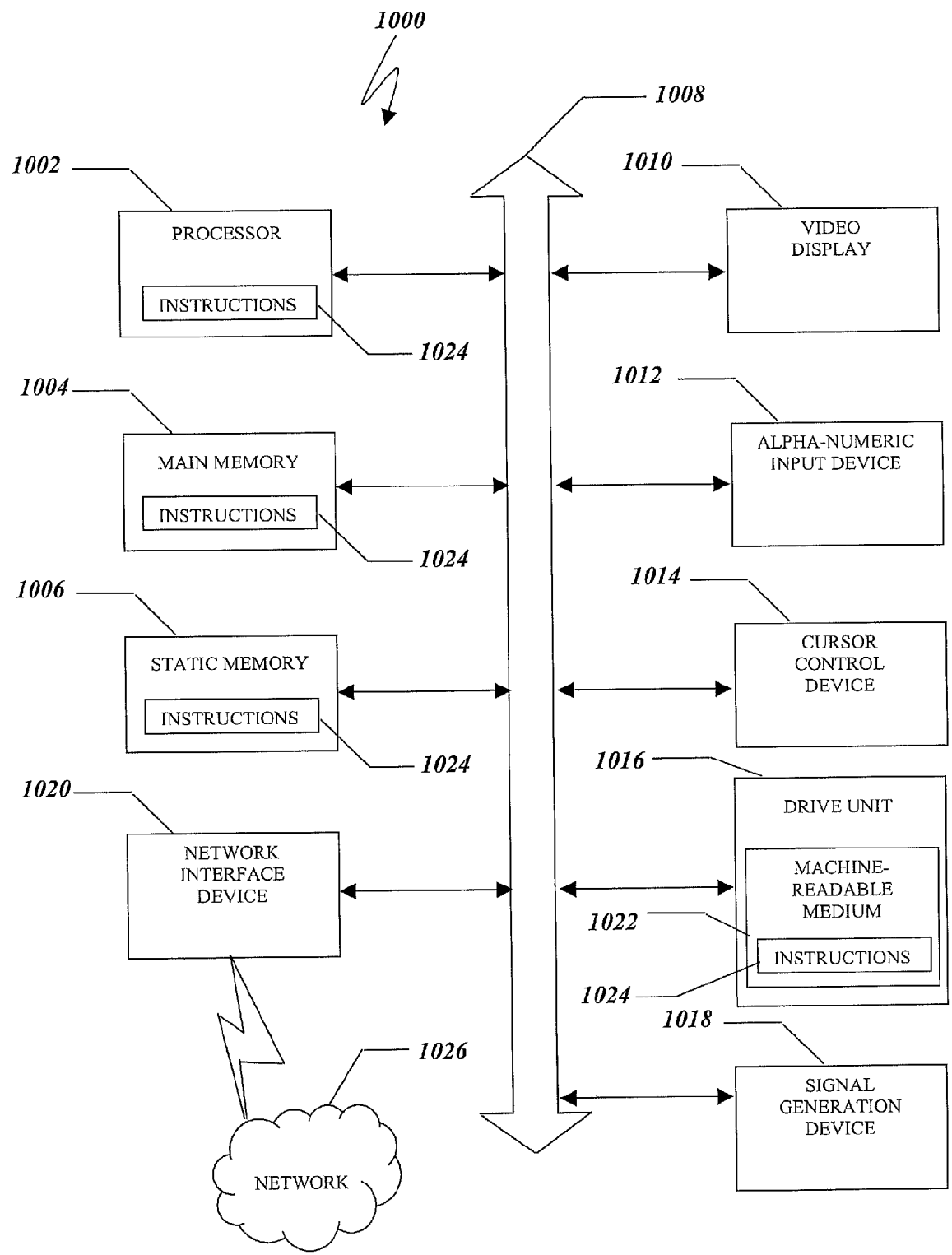
FIG. 10 is a diagrammatic representation of a machine in the form of a computer system within which a set of instructions, when executed, may cause the machine to perform any one or more of the methodologies of the illustrative embodiment.

Turning now to FIG. 10, FIG. 10 is a diagrammatic representation of a machine in the form of a computer system 1000 within which a set of instructions, when executed, may cause the machine, also referred to as a computer, to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the terms "machine" and "computer" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystals display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable medium 1022 on which is stored one or more sets of instructions (e.g., software 1024) embodying any one or more of the methodologies or functions described herein, including those methods illustrated in herein above. The instructions 1024 may also reside, completely or at least partially, within the main memory 1004, the static memory 1006, and/or within the processor 1002 during execution thereof by the computer system 1000. The main memory 1004 and the processor 1002 also may constitute computer-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The illustrative embodiment contemplates a computer-readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the computer-readable medium 1022 is shown in an example embodiment to be a single medium, the terms "computer-readable medium" and "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the illustrative embodiment. The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

What is claimed is:

1. A system for learning a data format, the system comprising:
    a processor in data communication with a computer readable medium;
    a computer program comprising instructions embedded in the computer readable medium, that when executed by a computer perform functions that are useful in learning the data format, the computer program further comprising instructions to input an initial description of a data format and a batch of data comprising data in a new data format not covered by the initial description, instructions to use the initial description to parse the records in a data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and
    instructions to use a non-incremental format inference system to infer descriptions for an aggregated portions of input data that did not parse using the first description D, wherein a term with type R is a parse tree obtained from parsing the input data using a description D and wherein parsing a base type results in a value with the corresponding type, wherein a parse of a pair is a pair of representations, and a parse of a union is a parse selected from the group consisting of a parse of a first branch of the union or a parse of the second branch of the union, the system further comprising:
    an aggregate data structure embedded in the computer readable medium for containing data indicating an accumulation of parse trees and data that cannot be parsed using the first description, D and therefore must be re-learned, a learn node data structure embedded in the computer readable medium containing data indicating an accumulation of the data that did not parse using the first description that needs to be learned, the computer program further comprising instructions to finish parsing all the data, instructions to obtain a final list of aggregates and instructions to select the best aggregate according to at least one criterion, instruction to update the first description, D to produce the new description D' using the best aggregate and instructions to introduces Opt nodes whenever a corresponding Base or Sync token in the initial description D, failed to parse, wherein when faced with an entirely new form of data, the computer program further comprises instructions to apply a set of rewriting rules that server to improve the description by reducing a metric designed to measure description quality, the computer program further comprising instructions to rank the parses by a metric that measures their quality and return only the top quantity k of the parses metric comprises a triple: m=(e, s, c), where e is a quantity of errors, s is a quantity of characters skipped during Sync token recovery, and c is a quantity of characters correctly parsed.

2. The system of claim 1, the computer program further comprising instructions to define a clean function that first partitions the triples into groups that share the substring of the input consumed by the parse, instructions to retain all perfect parses for each group and if none exist retain the best parse in the group and instructions to return all the perfect triples plus up to the top k non-perfect triples.

3. The system of claim 2, the computer program further comprising instructions to terminate a candidate parse when parsing a struct with multiple fields if a threshold quantity T of errors in succession are encountered.

4. The system of claim 3, computer program further comprising instructions to maintain a global memo table data structure embedded in the computer readable medium, wherein the data structure stores data used by the processor and indexed by the pair of a description D and the beginning position for parsing D which stores the result for parsing D at the specific position and instructions to bound the total number of aggregates the produces by selecting the top quantity, k aggregates with the fewest number of Opt and Learn nodes.

5. A non-transitory computer readable medium containing a computer program comprising instructions that when executed by a computer perform functions that are useful in learning a data format, the computer program comprising:

instructions to input an initial description of a data format and a batch of data comprising data in a new data format not covered by the initial description, instructions to use the first description to parse the records in a data source, instructions to discard records in the input data that parse successfully, instructions to collect records that fail to parse, instructions to accumulate a quantity, M of records that fail to parse, instructions to return a modified description that extends the initial description to cover the new data, instructions to transform the first description, D into a second description D' to accommodate differences between the input data format and the first description D by introducing options where a piece of data was missing in the input data and introducing unions where a new type of data was found in the input data; and instructions to use a non-incremental format inference system to infer descriptions for the aggregated portions of input data that did not parse using the first description D, wherein a term with type R is a parse tree obtained from parsing the input data using a description D and wherein parsing a base type results in a string, an integer or an error, wherein a parse of a pair is a pair of representations, and a parse of a union is a parse selected from the group consisting of a parse of a first branch of the union or a parse of the second branch of the union, the medium further comprising an aggregate data structure embedded in the computer readable medium for containing data indicating an accumulation of parse trees and data that cannot be parsed using the first description, D and therefore must be re-learned, a learn node data structure embedded in the computer readable medium containing data indicating an accumulation of the data that did not parse using the first description that needs to be learned, the computer program further comprising instructions to finish parsing all the data, instructions to obtain a final list of aggregates and instructions to select the best aggregate according to at least one criterion, instructions to update the first description, D to produce the new description D' using the best aggregate and instructions to introduces Opt nodes whenever a corresponding Base or Sync token in the initial description D, failed to parse, wherein when faced with an entirely new form of data, the computer program further comprises instructions to introduce a series of Opt nodes as each type in the original description D, fails in succession, instructions to collapses the series of Opt nodes if they are at least one always present and all always absent, and instructions to verify maintain a table that records the branching decisions when parsing each data line.

6. The medium of claim 5, the computer program further comprising instructions to rank the parses by a metric that measures their quality and return only the top quantity k of the parses, wherein the metric comprises a triple: m=(e, s, c), where e is a quantity of errors, s is a quantity of characters skipped during Sync token recovery, and c is a quantity of characters correctly parsed.

7. The medium of claim 6, the computer program further comprising instructions to define a clean function that first partitions the triples into groups that share the substring of the input consumed by the parse, instructions to retain all perfect parses for each group and If none exist retain the best parse in the group and instructions to return all the perfect triples plus up to the top k non-perfect triples.

8. The medium of claim 7, the computer program further comprising instructions to terminate a candidate parse when parsing a struct with multiple fields if a threshold quantity, T of errors in succession are encountered.

9. The medium of claim 8, the computer program further comprising instructions to maintain a global memo table data structure embedded in the computer readable medium, wherein the data structure stores data used by the processor and indexed by the pair of a description D and the beginning position for parsing D which stores the result for parsing D at the specific position and instructions to bound the total number of aggregates the produces by selecting the top quantity, k aggregates with the fewest number of Opt and Learn nodes.

* * * * *